(12) United States Patent
Collins (10) Patent No.: US 6,602,919 B1
(45) Date of Patent: Aug. 5, 2003

(54) METHOD FOR PREPARING HYDROUS ZIRCONIUM OXIDE GELS AND SPHERULES

(75) Inventor: Jack L. Collins, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 09/397,905

(22) Filed: Sep. 17, 1999

(51) Int. Cl.$^7$ .............................. C08J 3/02; B01J 20/02; C01G 25/02
(52) U.S. Cl. .......................... 516/98; 502/405; 423/69; 423/71; 423/81; 423/608
(58) Field of Search ........................... 516/98; 502/405; 423/69, 71, 81, 608

(56) References Cited

U.S. PATENT DOCUMENTS

| | | | |
|---|---|---|---|
| 3,522,187 A | 7/1970 | Kraus | 252/179 |
| 4,113,660 A | 9/1978 | Abe et al. | 502/84 |
| 4,161,513 A | 7/1979 | Forberg et al. | 423/598 |
| 4,313,844 A | 2/1982 | Sato et al. | 252/193 |
| 4,397,778 A | 8/1983 | Lloyd | 252/637 |
| 4,502,987 A | 3/1985 | Lloyd et al. | 252/635 |
| 4,511,455 A | 4/1985 | Dosch et al. | 423/598 |
| 4,748,016 A | 5/1988 | Browaeys et al. | 423/598 |
| 5,122,360 A | 6/1992 | Harris et al. | 423/608 |
| 5,207,973 A | 5/1993 | Harris et al. | 266/170 |
| 5,821,186 A | 10/1998 | Collins | 516/98 |

FOREIGN PATENT DOCUMENTS

WO   WO 98/19786   * 5/1998

OTHER PUBLICATIONS

"The Basic Chemistry Involved in the Internal–Gelation Method of P{recipitating Uranium as Determined by pH Measurements", J.L. Collins et al., *RadioActa*, pp. 121–134, 1987. Month unknown.

"Evaluation of Selected Ion Exchangers for the Removal of Cesium from MVST W–25 Supernate", J.L. Collins et al., *ORNL/TM–12938*, pp. 1–48, Apr. 1995.

"Development and Testion of Ion Exchangers for Treatment of Liquid Wastes at Oak Ridge National Laboratory", J.L. Collins et al., *ORNLTM–12315*, pp. 1–53, Mar. 1993.

"A Gel Sphere Process for FBR Fuel Fabrication from Coprocessed Feed", M.H. Lloyd et al., *ORNL/TM–8399*, pp. 1–46, Feb. 1983.

"Batch Test Equilibration Studies Examining the Removal of Cs, Sr, and Tc from Supernatants from ORNL Undergroud Storage Tanks by Selected Ion Exchangers", J.L. Collins et al., *Proceedings of the 2$^{nd}$ International Conference of Waste Management: Challenges & Innovations in the Management of Hazardous Waste*, pp. 1–13, May 1995.

"Sorption of Strontium (II) and Radio Strontium Ions on Sodium Titanate", O.J. Heinonen et al., *Radiochimica Acta*, 28 pp. 93–96, 1981. Month unknown.

* cited by examiner

*Primary Examiner*—Daniel S. Metzmaier
(74) *Attorney, Agent, or Firm*—Kilpatrick Stockton LLP (57) ABSTRACT

Methods for preparing hydrous zirconium oxide spherules, hydrous zirconium oxide gels such as gel slabs, films, capillary and electrophoresis gels, zirconium monohydrogen phosphate spherules, hydrous zirconium oxide spherules having suspendable particles homogeneously embedded within to form a composite sorbent, zirconium monohydrogen phosphate spherules having suspendable particles of at least one different sorbent homogeneously embedded within to form a composite sorbent having a desired crystallinity, zirconium oxide spherules having suspendable particles homogeneously embedded within to form a composite, hydrous zirconium oxide fiber materials, zirconium oxide fiber materials, hydrous zirconium oxide fiber materials having suspendable particles homogeneously embedded within to form a composite, zirconium oxide fiber materials having suspendable particles homogeneously embedded within to form a composite and spherules of barium zirconate. The hydrous zirconium oxide spherules and gel forms prepared by the gel-sphere, internal gelation process are useful as inorganic ion exchangers, catalysts, getters and ceramics.

5 Claims, 1 Drawing Sheet

METHOD FOR PREPARING HYDROUS ZIRCONIUM OXIDE GELS AND SPHERULES

This invention was made with Government support under Contract No. DE-AC05-96OR22464 awarded by the U.S. Department of Energy to Lockheed Martin Energy Research Corp., and the Government has certain rights in this invention.

FIELD OF THE INVENTION

The present invention is directed to a method for preparing inorganic ion exchangers, catalysts, getters and ceramics. In particular, the present invention is directed to a method for preparing gels, including electrophoresis gels and spherules, of hydrous zirconium oxide and variations thereof. The hydrous zirconium oxide gels are prepared using an internal gelation process through the implementation of process control parameters that control the type of gel, gel shape and size, and microstructure of the material.

BACKGROUND OF THE INVENTION

Hydrated oxides of many metals (such as titanium, zirconium, hafnium, tin, aluminum, lead, cerium, tungsten, magnesium, manganese, etc.), acidic salts of polyvalent metals (phosphates, tungstates, antimonates, molybdates, tellurates, selenates, silicates, vanadates and hexacyanoferrates of elements such as ammonium, titanium, zirconium, hafnium, tin, lead, etc.), and heteropoly acid salts (ammonium molybdophosphate, ammonium phosphotungstate, ammonium molybdosilicate, ammonium tungstoarsenate, titanium phosphosilicate, etc.) are very effective inorganic ion exchange materials. Because inorganic ion exchangers are stable in high radiation fields, they are especially important in the removal of radionuclides from waste streams. They have high selectivities and efficiencies for separating and removing fission products (e.g., cesium, europium, cerium, ruthenium, zirconium, and strontium), actinides, and other elements (such as silver, lead, mercury, nickel, zinc, chromium, and fluoride) from aqueous waste streams. Most of these materials are also compatible with the matrices used for long term waste storage such as in glass, phosphate or grout. Certain metal oxides, such as iron oxide and titanium oxide, are known to be effective for use in the photocatalytic decomposition of various hazardous organics and for many other catalytic purposes. Also, many metal oxides are known to be very effective as getters in removing volatile fission products from off-gas streams over a broad range of temperature. As used herein, the term "getters" is meant to include any material capable of trapping another material within the getter material. For example, quartz wool ($SiO_2$) is used to remove volatile radioactive cesium from the off-gas stream of gas cooled nuclear reactors in Great Britain.

Inorganic exchangers and sorbents, such as hydrous zirconium oxide, are only commercially available as pure material in powder or granular form. These fine powders and granular particles are not readily adaptable to continuous processing, such as column chromatography. They have poor hydrodynamic properties. Some of these powders are also made as pellets by using binding materials; however, the binders tend to lessen the number of exchange sites that are available for use. The binders also tend to block pores and passageways to the exchange sites within the structures and can adversely affect the loading and kinetic behavior of the exchangers.

Another disadvantage of many of the powders, granular material, and pellets is lack of sorbent reproducibility of the inorganic ion exchangers. These materials are prepared in batch processes in which chemical and physical gradients can occur that cause variances in the crystal morphology and compositions of the products. Also, the granular material is not very stable and tends to powder or erode, causing problems in column operations. Pelletized hydrous zirconium oxide that is held together by binding material can be used in columns; however, the loading capacity of this material is lower. Additionally, organic binders, when used to make the pellets, are not stable when exposed to high radiation doses. Finally, resins that contain hydrous zirconium oxide particles have less capacity for loading and are not stable when exposed to high radiation.

Inorganic exchangers have also been made by taking fine particles of hydrous zirconium oxide and embedding therein organic resins or inorganic materials, such as asbestos or zeolites. However, these embedded particles suffer from the same disadvantages as the other particle and granular-based ion exchange materials.

Individuals have attempted to remedy the problems associated with powders and particles by forming gel particles. There are a number of gel forming processes used in the preparation of inorganic sorbents, catalysts, ceramics, and getters. Common to all these processes is that the constituents of the processes need to be suitable for the bonding of colloidal particles into gel structures. The gels usually are hydrous metal oxides. These processes are generally identified as "sol-gel" processes and the chemistries are complex and path dependent. Typically, they are defined as external or internal gelation processes. In the external gelation processes, gelation reactions involve mass transfer to a second phase or fluid. By comparison, there is little or no mass transfer in the internal gelation processes.

One of the original external gel processes for the preparation of nuclear fuels was developed at Oak Ridge National Laboratories (hereinafter ORNL). It was based on the gelation of colloidal sol droplets by extracting the water from them in an immiscible alcohol. In other external gelation processes developed at various European laboratories, droplets of solutions of organic polymers or sols were chemically gelled with ammonia, usually by mass transfer of the ammonia from a surrounding gas or solution.

Making silica-alumina gel as spheres is an example of one an internal gelation process. Gel spheres were made by continuously mixing an acid solution of $AlCl_3$ or $Al_2(SO_4)_3$ with sodium silicate as drops into an immiscible organic medium. The aqueous droplets gelled while in the organic medium. The key to this process was the slow or delayed gelation of silica when the sodium silicate was acidified.

The most widely studied internal gelation processes in recent years involves the water hydrolysis of metal alkoxides. In these processes, solution temperature and pH are key parameters used in controlling hydrolysis and polymerization. However, materials made by the metal alkoxide processes typically are fine powders. Additionally, due to the complex chemistries involved and the difficulty in operating the process, it was difficult to form gel-spheres of hydrous metal oxides wherein the reaction could be controlled and the final product was predictable.

Accordingly, what is needed is a method of forming a hydrous metal oxide gel, specifically a hydrous zirconium oxide gel, wherein the gel is effective as an inorganic sorbent, catalyst, ceramic, or getter. What is also needed is a method of forming a hydrous metal oxide gel wherein the characteristics of the gel may be controlled to provide a gel which is useful for a variety of different uses. Finally, what is needed is a method of forming a hydrous metal oxide gel wherein the metal oxide gel may include other constituents which are selected to remove a variety of different materials, thereby increasing the usefulness of the metal oxide gel.

SUMMARY OF THE INVENTION

The present invention is directed to a method for preparing inorganic ion exchangers, catalysts, getters and ceramics. In particular, the present invention is directed to a method for preparing gels, including electrophoresis gels and spherules, of hydrous zirconium oxide and variations thereof. The hydrous zirconium oxide gels of the present invention are prepared using a gel-sphere, internal gelation process through the implementation of process control parameters that control the type of gel, gel shape and size, and microstructure of the gel material.

This invention is unique in that it provides a means of making ion exchangers more usable as an engineered form which can be used in large-scale column separations. The flow dynamics in column operations would be greatly enhanced by using the methods of the present invention to prepare inorganic ion exchangers as spherules. Because the spherules are stable forms and have little or no tendency of degrading under dynamic conditions, the use of inorganic ion exchangers can be greatly expanded.

Spherules of either pure hydrous zirconium oxide (HZrO) or HZrO which is embedded homogeneously throughout its matrices with fine particles of other selective ion exchange materials can be made by this invention. In some cases, gelatinous spherules of hydrous HZrO can be chemically converted to spherules of other ion exchange materials such as phosphates, silicophosphates, hexacyanoferrates, tungstates and molybdates.

One disadvantage of many of the inorganic ion exchangers that are made as powders, as granular material, or as pellets is the lack of sorbent reproducibility. These materials are prepared in batch processes in which chemical and physical gradients can occur that cause variances in the crystal morphologies and compositions of the products. When made by the present invention, these same materials are more reproducible. In some cases, the densities and porosities of an exchanger, when made as spherules, can be tailored, using the method of the present invention, by varying the chemical and physical process parameters. This allows some control over the selectivity and loading behavior of the exchanger.

The internal gelation method employed in the present invention provides a unique means of making hydrous metal oxide gel-spherules; however, the method is very different from previously described methods used to make silica-alumina gel-spheres.

The internal gelation method used in the present invention is related to the method or process that was used in the development of light water and breeder reactor spheroidal fuels at ORNL and other worldwide laboratories. The various apparatuses that have been designed to make the fuel spherules can also be used to make the hydrous zirconium oxide gels which are the subject of present invention. However, while the same preferred organic base and complexing agent may also be employed, there are significant differences in the other aspects of the process. The key to making spherules of hydrous zirconium oxide or any other metal oxide spherules lies in the formulations of the gel-forming materials and operating parameters by which the gels are formed. The formulations and the operating parameters for making gels of hydrous zirconium oxide, hydrous uranium oxide, and hydrous oxide mixtures of uranium and plutonium, and hydrous oxide mixtures of uranium and thorium are all uniquely different. The original concept for internal gelation processes which use organic bases (specifically hexamethylenetetramine (HMTA)), complexing agents (specifically urea), and metal salt solutions, was the Keuring van Electrotechnische Materialen at Arnhem (KEMA) process developed by M. E. A. Hermans et al. in the Netherlands. This process involved the production of uranium oxide spherules. One of the fuel processes which used the original idea of the KEMA process was described in U.S. Pat. No. 4,397,778 by M. H. Lloyd which emphasized the essential formulations and process parameters for making mixed oxide spherules of uranium and plutonium. Also, in U.S. Pat. No. 4,502,987 by M. H. Lloyd, et al., it was found more advantageous to heat-treat the HMTA-urea solutions by boiling for a sufficient duration and then cooling the resultant solution to about ambient temperature before admixture with a solution of metals selected from the group consisting of uranium, plutonium, thorium, and mixtures thereof, for subsequent spherule formation by passage through a formation nozzle. Heat-treated HMTA solutions of this invention expanded the use of U.S. Pat. No. 4,397,778 because these solutions allowed for the preparation of ceramic microspheres over a wider range of sphere densities in a controlled manner than previously possible with the teachings of U.S. Pat. No. 4,397,778.

The method of the present invention, while related to the prior art methods, are significantly different based upon the operating parameters used in the present invention. The method of the present invention uses optimum formulations and conditions for making hydrous zirconium oxide gels. Additionally, hydrous zirconium oxide microspheres may be made by the gel-sphere internal gelation process of the present invention. These optimum formulations and conditions create an optimum process parameter window for making the hydrous zirconium oxide spheres. The present invention is unique in that it provides a method for making ion exchangers into a more usable form rather than as a powder or granular form. Spherules of pure hydrous zirconium oxide are made by the method of the present invention. Spherules can also be made with the present invention in which very fine particles of other chemicals, metals, and biochemicals can be homogeneously dispersed throughout the matrix. Also, macroporous spherules may be made by forcing water from the spheres without shrinkage of the pores. Additionally, gelatinous spherules of hydrous zirconium oxide can be converted by chemical reactions to other ion exchanger spherules such as zirconium monohydrogen phosphate and zirconium hexacyanoferrate. Also, the hydrous zirconium oxide spherules can also be converted to other chemical forms, including, but not limited to, tungstate, molybdate, vanadate, and selenate. Furthermore, to create more surface area, spherules can be prepared containing embedded particles of material that can subsequently be dissolved and removed to create larger, interconnecting pores within the spherules. Finally, the present invention may be used to make other hydrous zirconium oxide gel shapes, such as films, fibers and slabs, which may be post-treated in the same manner as the spherules.

Once formed, the hydrous zirconium oxide gels of the present invention may be used in a variety of different processes including, but not limited to, the removal of cations, anions, or other elements from fluids and mixtures. Additionally, the gels may be used to remove radionuclides from fluids such as nuclear reactor waste waters. Finally, by including another ion exchange or sorbent particle, the gels may be used to remove selected materials from other solutions, such as the removal of gold or silver from fluids produced in the mining industry or photographic industry.

Accordingly, it is an object of the present invention to provide new methods for preparing inorganic ion exchangers and sorbents into a more useful form.

It is another object of the present invention to provide new methods for preparing more useful forms of catalysts.

Yet another object of the present invention is to provide new methods for preparing more useful forms of getters.

Another object of the present invention is to provide new methods for preparing more useful forms of ceramics.

Still another object of the present invention is to provide new methods for preparing gels for use in capillary, film or slab gel electrophoresis.

It is still another object of the present invention to provide new methods for creating more surface area in hydrous zirconium oxide gels.

Another object of the present invention is to provide new methods for forming macroporous zirconium oxide spherules.

Yet another object of the present invention is to provide new methods for converting hydrous zirconium oxide spherules to other chemical forms, including, but not limited to, phosphates, tungstate, molybdate, vanadate, and selenate.

Still another object of the present invention is to provide new methods for making ultra fine hydrous zirconium oxide particles using an electric dispersion reactor.

Another object of the present invention is to provide spherules of hydrous zirconium oxide and variations thereof that are used as inorganic ion exchangers.

It is still another object of the present invention to provide spherules of hydrous zirconium oxide and variations thereof that are used as catalysts.

Yet another object of the present invention is to provide spherules of hydrous zirconium oxide and variations thereof that are used as getters.

It is still another object of the present invention to provide ceramic precursors, such as barium zirconate or strontium zirconate, which are useful in the electronic industry, particularly in the area of computer and electronic circuitry.

Another object of the present invention is to provide new inorganic ion exchangers as microspheres that exhibit good chemical stability in acidic and basic solutions.

Still another object of the present invention is to provide new inorganic ion exchangers as microspherules that are highly selective for certain cations and anions.

Yet another object of the present invention is to provide new inorganic ion exchangers as microspherules that are compatible with final waste forms.

It is still another object of the present invention to provide new inorganic ion exchangers as microspherules that improve the flow dynamics for column operations.

These and other objects, features and advantages of the present invention will become apparent after a review of the following detailed description of the disclosed embodiments and the appended claims.

DETAILED DESCRIPTION

The method of the present invention uses optimum formulations and conditions for making hydrous zirconium oxide gels. These optimum formulations and conditions create an optimum process parameter window for making hydrous zirconium oxide spheres, films, fibers and slabs. The present invention is unique in that it provides a method for making ion exchangers into a more usable form rather than as a powder or granular form. Spherules of pure hydrous zirconium oxide may be made by the method of the subject invention. The spherules may be of a specific size, such as in a diameter range of 0.1 mm to 2 mm, and may be reproducibly made using laboratory and engineering scale equipment.

Additionally, the present invention can also be used to make spherules in which very fine particles of other chemicals, metals, and biochemicals are homogeneously dispersed throughout the matrix of the gel. Variations of spherules of hydrous zirconium oxide which contain fine particles of other inorganic ion exchangers include, but are not limited to, zirconium monohydrogen phosphate, sodium zirconate, zirconium tungstate, zirconium molybdate, ammonium molybdophosphate, ammonium phosphozirconate, silicozirconate, and hexacyanoferrates. These materials are embedded homogeneously throughout the gel matrix to produce dual purpose ion exchangers capable of removing several different contaminants from a waste stream. For example, hydrous zirconium oxide microspheres can be made that contain potassium cobalt hexacyanoferrate particles. In a pH-basic stream saline solution, this material can selectively remove both cesium and strontium. The hydrous zirconium oxide sorbs the strontium and the potassium cobalt hexacyanoferrate sorbs the cesium. In some cases, gelatinous spherules of hydrous zirconium oxide can be converted by chemical reactions to other ion exchanger spherules such as zirconium monohydrogen phosphate and zirconium hexacyanoferrate. The hydrous zirconium oxide spherules can also be converted to other chemical forms, including, but not limited to, tungstate, molybdate, vanadate, and selenate. Furthermore, to create more surface area, spherules can be prepared containing embedded particles of material that can subsequently be dissolved and removed to create larger, interconnecting pores within the spherules.

Finally, the present invention may be used to form hydrous zirconium oxide gels in any shape, such as films, fibers, or slabs, wherein these hydrous zirconium oxide gels may be used alone, or post-treated as set forth above, to be used as inorganic ion exchangers, catalysts, getters and ceramics in systems which may preclude the use of spherules.

In one embodiment of the present invention, the hydrous zirconium oxide may be formed into microspheres for use as an inorganic ion exchanger. Preparation of inorganic ion exchangers as microspheres improves the flow dynamics for column operations and expands their practical applications. The hydrous zirconium oxide spherules produced by the present invention can be reproducibly made on a small or large scale. These inorganic ion exchangers are stable in high radiation fields. Additionally, many embodiments of the present invention exhibit good chemical stability in acidic and basic solutions, while some embodiments are highly selective for certain cations and anions. Finally, most embodiments are compatible with final waste forms, such as for inclusion in a vitrification process or placement into concrete. Inorganic microspheres produced by the present invention are also capable of removing highly radioactive fission products from radioactive cell waste solutions. In addition, the inorganic ion exchanger spherules produced by the present invention have sorption characteristics that are equal to or better than those obtained for most commercial powders tested. One advantage of the present invention is that the densities and/or porosities of the spherules can be tailored by varying process parameters to produce a finished spherule which is optimally designed for a specific sorption process.

Some ion exchange applications of the spherules of the present invention include removing cesium, strontium, and actinides from acid solutions, as well as removing strontium, technetium, and cesium from tank supernatants. The spherules can also be used for treating contaminated wastewater to remove undesirable elements such as uranium, technetium, cobalt, and lead. Other applications of the present invention include removing radioisotopes from groundwater and removing actinides and fission products from sludge leachates. In addition, other applications include removal of heavy metals from acidic mine drainage; removal of radionuclides from organic streams; removal of fluoride from waste streams; and cleanup and concentration of liquid wastes in radioactive cells.

The method of the present invention can also be used as a means of preparing gels for use in capillary, film or slab gel electrophoresis. For example, the gel formulations may be vacuumed into capillary tubes which are then heated to cause formation of fibrous gels. The same procedure may also be used to make hydrous zirconium oxide films or gel slabs. The gel formulations of the present invention may be drawn into molding cavities and heated to form the gel film or slab. The surfaces of the molding cavities may be pretreated to facilitate removal of the gels. Once removed from the molds, the gels are easily washed to remove any reaction impurities.

The method of the present invention uses optimum formulations and conditions for making hydrous zirconium oxide gels. These formulations or "broths" are an important aspect of making the hydrous zirconium oxide gels. Without the proper broth formulation and reaction conditions, it is not possible to form the desired hydrous zirconium oxide gel sphere. Therefore, even though the internal gelation process used to form the spherules of the present invention has been used to form other types of spherules, one cannot simply make hydrous zirconium oxide gels without using the proper formulation and reaction conditions. Additionally, by controlling the broth, it is possible to affect the final characteristics of the gel, such as size, shape, porosity, and density.

Therefore, the key parameters of the method of the subject invention include the following: concentrations of the constituents of the broth; broth stability; reaction temperature; gelation time; completeness of gelation; and the structures and chemical composition of gels formed.

The concentrations of the constituents of the broth are an important factor in making microspheres by the internal gelation process. These constituent concentrations influence the broth stability, gelation times, and types of gels. In the method of the present invention, a broth for making hydrous zirconium oxide contains four chemical constituents: an organic base; a complexing agent; a zirconium metal salt; and an acid. The initial concentrations of these constituents in the broth and the order of mixing these chemicals are important. Initially, two separate stock solutions are prepared. One contains the organic base and the complexing agent and the other contains the zirconium metal salt solution and the acid. Alternatively, the complexing agent can be added to the zirconium metal salt and acid solution rather than with the organic base solution. The complexing agent can be added to either solution provided the final mole ratio of complexing agent to zirconium is greater than or equal to ($\geq$) 1. The preferred practice of the present invention is to use a mole ratio of complexing agent to Zr that is similar to the mole ratio of organic base to Zr. To prepare a broth, these solutions are chilled to less than about 10° C., and preferably near 0° C. before they are mixed.

The organic base is used to help form the gel spherules. In an internal gelation method, the broth is introduced into a heated organic medium to form the gel spherules. Introduction of the broth droplets into a flowing stream of hot organic medium causes decomplexation of the zirconium molecules that are complexed with the complexing agent, which then allows the zirconium to be hydrolyzed. While not wanting to be bound by the following statement, it is believed that this hydrolysis reaction is driven by protonation of the organic base molecules which effectively removes $H^+$ from the broth. Once the organic base molecules are completely protonated, they decompose and remove more hydrogen ions. For example, one hexamethylenetetramine (HMTA) molecule can remove four hydrogen ions from the broth. The rates at which these reactions occur depend upon the temperature of the broth and upon the concentrations of the constituents. For gelation to occur, the pH of the broth droplets should be at or above the pH of precipitation. Precipitation begins in the pH range of 1 to 3 for hydrous zirconium oxide. Therefore, a preferred organic base is one that protonates and decomposes to remove hydrogen ions and hydrolyze the reaction. The preferred organic base is HMTA.

The complexing agent is used to complex with the zirconium and allows for stable broths at 0° C. As used herein, "stable broth" is meant to include a broth that stays clear and free of metal gelation or precipitation for a reasonable period of time, preferably $\geq 1$ hour, before gelation is initiated. As discussed, the organic base is used to hydrolyze the zirconium and cause gel formation at higher temperatures. At higher temperatures, the complexing agent also catalyzes the decomposition of protonated organic base molecules resulting in the organic base molecules being a more effective base. However, decomposition only occurs after most of the organic base molecules have been protonated. To provide more control over the final concentrations of the constituents in the broth, a saturated stock solution of about 3.5 M organic base is prepared which also has a complexing agent concentration of about 3.5 M. The amount of the complexing agent does not have to approximate the amount of the organic base, though this type of broth is preferred as it ensures the proper mole ratios as against the amount of zirconium. The preferred complexing agent is urea.

The first stock solution comprises the organic base and the complexing agent. Additionally, since the final broth preferably has both a ratio of organic base to Zr and a ratio of complexing agent to Zr of $\geq 1$, then preferably the first stock solution has a ratio of organic base to complexing agent of about 1:1, although the exact ratio of organic base to complexing agent may vary as desired. The stock solution should be chilled to less than about 10° C., and more preferably to about 0° C., prior to mixing with the second stock solution comprising the zirconium metal salt and the acid. The stock solution is chilled to avoid premature gelation since the hydrous zirconium oxide will gel as the temperature increases.

In a preferred embodiment, the first stock solution of organic base and complexing agent comprises HMTA as the organic base and urea as the complexing agent. The stock solution is preferably prepared using pure crystalline HMTA rather than the more commonly used free flowing form of HMTA. The free flowing form is granular HMTA that contains additives that prevent clumping. Clumping is problematic with the pure crystalline form of HMTA. It was discovered that the additives used to make the HMTA free flowing also cause an undesirable reaction to occur between the HMTA and urea. This reaction can be detrimental to the internal gelation process, thereby making it less reproducible, especially for runs at higher temperatures (i.e., >80° C.). This behavior was observed when samples of about 3.2 M HMTA (free flowing type) and about 3.2 M urea were heated together at 95° C. for several minutes. The solution developed a pearl-essence that intensified with time. The crystalline form of HMTA is recommended in the process of the present invention; however, the free flowing form of HMTA can also be used in some applications, especially at temperatures <80° C. and for some applications at temperatures >80° C., depending upon which additives the manufacturer added to the HMTA to facilitate its free-flowing properties.

The second stock solution used to make the broth of the present invention comprises the zirconium metal salt and the acid. Zirconium metal salts useful in the present invention include any zirconium salt which is soluble. The zirconium metal salt should provide a sufficient Zr ion concentration in the solution. Examples of these soluble zirconium metal salts include, but are not limited to, zirconyl nitrate, zirconyl chloride, and zirconium tetrachloride.

When water is added to the zirconium metal salt (ZrX), an exothermic reaction occurs with the formation of hydrous zirconium oxide gel and an acid. The types of acids are discussed below. Water acidified with the acid is used to dilute the zirconium metal salt to prepare a stable stock solution. When a sufficient amount of acid is added, the hydrolysis reaction is suppressed and gel formation is prevented. As described later, the amount of acid used in a broth is one of the important process parameters for the present invention. The amount of acid used in a broth is a controlling parameter for the gelation process for making hydrous zirconium oxide spherules, or gels in other configurations.

In the broth formulations that are described in the present invention, the concentrations of hydrogen ion refer only to the hydrogen ions from the acid that is added to the broth. The acid is added to the broth to help suppress or prevent hydrolysis and gel formation at low temperatures (0° to 50° C.). The amount of acid used is one of the important process parameters for this invention since the acid affects the gelation processes. The $H^+$ concentration is important since it helps prevent premature gelation when the complexing agent and organic base are added to the zirconium metal salt solution. A stable broth can be prepared with no addition of acid if the organic base:Zr ratio is 1:1 or less. However, the gelation time for a broth with an organic base:Zr ratio of between about 1 to 1.1 is between about 25 and 30 seconds at 90° C. At lower temperatures, the gelation times are even longer. Any acid may be used, such as hydrochloric acid, nitric acid, sulfuric acid, or phosphoric acid, as long as the acid provides hydrogen ions to help regulate the process. However, in general, the acid selected is dependent upon the zirconium metal salt used, such that the second stock solution comprises a mixture of ZrX and HX, wherein X is F, Cl, Br, I, $NO_3$, $HSO_4$, $H_2PO_4$, or $HCO_3$. Nitric acid and, for non-stainless steel systems, hydrochloric acid are the preferred acids.

Therefore, in one preferred embodiment of the present invention, the zirconium metal salt is zirconyl nitrate and the acid is nitric acid while in another preferred embodiment, the zirconium metal salt is zirconyl chloride and the acid is hydrochloric acid. However, it is to be understood that the mixture of ZrX/HX is not a required mixture.

When forming the second stock solution, as with the first stock solution, the solution should be chilled to less than about 10° C., and more preferably to about 0° C., prior to mixing with the first stock solution. Then, when the two solutions are mixed, the final broth will also be chilled to less than approximately 10° C. This is one of the important factors in making a stable broth. In the present invention, the optimum process parameter window for making microspheres of hydrous zirconium oxide includes a broth that is stable for a reasonable period of time at ice bath temperatures near 0° C. Broth formulations that are stable for $\geq$ about 1 hour are desirable for large scale preparations. The formulations declared in the optimum process window for this invention are therefore stable for $\geq$ about 1 hour. The broth droplets should be introduced in a hot organic medium before gelation is initiated. Broths that gel in less than one hour could be used if the first stock solution of the organic base and complexing agent and the second stock solution of zirconium metal salt and acid were pumped from separate tanks into a mixing device prior to ejection as droplets into the hot organic medium. A mixing method of this type would likely be used in large scale production of spherules.

To make reproducible gel spherules, it is important that the ingredients in the broth be thoroughly mixed. The stock solution of organic base and complexing agent and the stock solution of zirconium metal salt and acid are combined in a chilled mixing device or by pumping the two different solutions, at temperatures in a range of from about 0° to 10° C., from separate tanks into a mixing device at a desirable rate to make the specific broth desired. The batch volume used and the desired pumping rates for a broth are dependent upon the type of gel sphere desired, whether it be a soft, medium or hard gel. In the present invention, the type of desired gel sphere is selected from an optimum process parameter window, as shown in the Examples. These examples provide preferred broth formulations and gel forming conditions that are used to make hydrous zirconium oxide gel spheres.

As shown in the Examples, the process parameters of broth formulations within this defined window are important in forming the hydrous zirconium oxide gels. If the constituent concentrations for the organic base, complexing agent, zirconium metal salt, and/or the acid fall outside these parameters, then either the broth will gel instantly once the constituents are mixed, or not at all.

In general, the molarity of the zirconium in the broth should be in the range of about 0.3 to about 1.0 M. However, the preferred molarity of zirconium in the broth is in the range of about 0.4 M to about 0.8 M. An organic base:$H^+$ mole ratio of $\geq 0.9$ is needed for gelation to occur for a specified gelation time of $\leq 60$ seconds. However, lower ratios may be used if a gelation time of greater than 60 seconds is desired. In these situations, the gels formed will be larger in size due to coalescence.

The amount of the organic base and the complexing agent in the broth will be approximately the same for the reasons previously discussed. These amounts will vary depending on the temperature at which the gel is formed. Higher temperatures permit the use of lower amounts of organic base and complexing agent, and lower temperatures permit the use of higher amounts of organic base and complexing agent. In the present invention, the temperatures at which the gels may be formed range from ambient temperature to about 100° C. These temperature conditions require the concentration of the organic base and the complexing agent to range from about 0.5 M to about 3.5 M. A concentration of about 3.5 M is considered to be the saturation concentration for each of the organic base and the complexing agent. However, in determining the concentration of the organic base and the complexing agent, it is important to remember that the organic base:Zr and complexing agent:Zr ratios should both be $\geq 1:1$. It is to be understood that the ratio of organic base:complexing agent, while preferably about 1:1, may be any desired ratio.

The amount of acid used can range from about 0 M to about 1.2 M. As previously discussed, an acid is not necessary for the formation of the hydrous zirconium oxide gels, but the acid prevents premature gelation when the broth is formed. The acid also permits quicker gelation times by allowing higher organic base:Zr ratios to be employed. In a preferred embodiment, the concentration of acid in the broth is from about 0.2 M to about 0.6 M.

Therefore, in a preferred embodiment of the present invention for making spherules, the ideal acid concentration for the broth is between about 0.2 M and about 0.6 M, and the ideal Zr concentration is between about 0.4 M and about 0.8 M. The amount of organic base and complexing agent used will be dependent upon the amount of Zr and the gel-forming temperature. Preferably, the amounts of the organic base and the complexing agent are from about 0.6 to about 2.0 M. If the mole ratios of organic base:$H^+$ and organic base:Zr are kept substantially constant at the desired ratios for each of the organic base and the complexing agent, dilution of any of the above mentioned broth mixtures increases the gelation time and yields softer gel structures. The rigidity only slightly decreases by a 20% dilution. A dilution of 40% results in a gel structure that is about half as rigid as a non-diluted gel. Gel times increase by 10 seconds for dilutions of 60% in relation to gel times for non-diluted broth mixing.

Gels prepared as described in the Examples give a range of rigidities from soft to hard. Initially, a range of relative gel rigidities was determined by conducting small scale, test tube studies using about 0.5 mL of broth. In each study, a test tube containing 0.5 mL of broth was inserted into a water bath that was maintained at a temperature range of 55° to 65° C., 65° to 75° C., 75° to 85° C., or 85° to 95° C. After bath immersion for 10 minutes, the test tube was removed and cooled to room temperature. A small metal laboratory spatula was inserted into each gel to determine the apparent rigidity of the gel formed. A nominal scale of 1 to 10 collins units of rigidity was used to define the rigidity of the gel. A unit of 1 collins represented gels with the approximate consistency of water and 10 collins representing gels that were almost too hard to penetrate with the spatula. Most of the gels formed using broth parameters of the present invention had rigidities between 3 collins and 8 collins. Gels ranked as 3 collins were very soft and pasty, whereas gels ranked as 8 collins were difficult to penetrate and stir with the spatula because they had a hard, dry, granular consistency.

In making more accurate dynamometric measurements of the compression strengths of the gel-spherules, the hardest gels (8 collins) were capable of withstanding a force up to about 60 grams before losing their shape. On the other hand, the softest gel-spherules with rigidity ratings of 3 collins and 4 collins were easily compressed with forces of 5 grams or less. For the broth formulations defined in the Examples, the harder gels (7 collins and 8 collins) can only be made at higher temperatures (>75° C.). The gels that ranked as 7 collins and 8 collins were also the most opaque gels. The gels that ranked as 3 collins and 4 collins were the least opaque. The clearest gels were also made at lower temperatures (<65° C.).

As previously discussed, the optimum process parameter window for making spherules of hydrous zirconium oxide includes that the broth is stable from about 0° C. to about 10° C. for a reasonable period of time, sufficient to prevent premature hydrolysis and gelation of the Zr prior to being introduced as droplets into the heated organic medium. The broth formulations declared in the optimum process window of the present invention are stable for $\geq 1$ hour.

Reaction temperature and gelation time are also important process variables. The organic medium is preferably water-inmuiscible with a density slightly higher than that of the aqueous broth. Large droplets are best formed if there is a density difference between the organic medium and broth of about 0.05 to 0.10 g/cm$^3$. The density difference can be less for small droplets. Other important process variables that should be considered in performing the methods of the present invention include flammability, toxicity, impurities, cost and disposal of the organic medium.

The organic medium may be a one-component solvent or a binary mixture. For example, silicone oils, such as Silicon Fluid 200 (Dow Corning, Midland, Mich.), work well for the temperature range from ambient temperatures to 100° C. A mixture of approximately 75% perchloroethylene (PERC) and 25% iso-amyl alcohol (IAA) can be used at temperatures up to about 90° C., but does not require an organic wash before the basic washes. Trichloroethylene (TCE) can be used at temperatures of $\leq 65°$ C. Kerosine type hydrocarbons and 2-ethyl-1-hexanol may also be used as gel forming media.

If the organic spherule-forming medium has a high viscosity or boiling point (e.g., PERC, 2-ethyl-1-hexanol or silicone oil), the residual medium on the gelled spherules has to be removed by washing with a more volatile organic medium. TCE, carbon tetrachloride or hexane can be used for silicone oil; isopropyl alcohol for PERC; and carbon tetrachloride for 2-ethyl-1-hexanol. Neither TCE nor the 75% PERC nor 25% isoamyl alcohol require an organic wash after aging of the gel.

Introduction of the aqueous broth droplets into a flowing stream of hot, water-immiscible, organic medium causes decomplexation of the Zr molecules that are complexed with the complexing agent, allowing hydrolysis and gelation of the Zr to occur. The hydrolysis reaction is driven by protonation of the organic base molecules, which effectively removes $H^+$ from the broth. The hydrolysis reaction is also driven, in some cases, by the decomposition of the protonated organic base molecules to form ammonia molecules. The rate at which these reactions takes place depends upon both temperature and the concentrations of the constituents in the broth.

The pH value of the broth droplets must be at, or above, the pH value of precipitation for gelation to occur. Precipitation begins in the pH range of 1 to 3 for hydrous zirconium oxide. The organic medium is heated at a temperature in the range of 45° C. to 100° C. to obtain acceptable gelation times for hydrous zirconium oxide. A gelation time of $\leq 60$ seconds is recommended. For operating reasons and for practical purposes, gelation times of $\leq 30$ seconds are normally preferred. As the microdroplets of broth remain ungelled in the hot organic medium, the risk of their coalescing and forming larger droplets increases.

The temperature of the organic medium used also affects the hardness of the gel formed, from soft to hard. The spherules are held in the hot organic medium and allowed to age until they are removed. Allowing the gelled spherules to remain in the heated organic medium for a period of 10 to 30 minutes assures completion of zirconium hydrolysis and reproducibility of the gelation process. The degree of aging can influence the type of gel structure obtained. After being held in the heated organic medium for a period of $\leq 60$ minutes, preferably between 10 and 30 minutes, to allow for completeness of the gelation and for aging, the spherules are removed from the organic medium. Then, the spherules are washed with ammonium hydroxide ($NH_4OH$), generally $\leq 1$ M, to remove the residual impurities, and dried. If silicone oil, 2-ethyl-1-hexanol, or PERC is used, the residual medium on the gelled spherules is removed with an organic solvent, such as trichloroethane (TCE), before basic washing with an aqueous medium. The soluble reactants and reaction products, organic base, complexing agent and ammonium salts, such as ammonium chloride, can be removed from the gelled spherules by washing with 0.1 M to 5 M ammonium hydroxide and then with deionized water.

The type of drying procedure employed depends upon the intended use of the spherules, such as sorbents, catalysts or getters. A number of drying methods may be employed. For an example see ORNL/TM-8399 report published February, 1983 by M. H. Lloyd et al., entitled "A Gel Sphere Process for FBR Fuel Fabrication from Coprocessed Feed," incorporated herein by reference in its entirety. The drying conditions of the wet spherules were found to have a pronounced effect on the densities of the final oxide products. To make ceramic oxides as crystals to be used as catalysts and getters, parameters such as heat-up rate, time, temperature, and drying atmosphere affect crystal growth. For instance, steam can be used in the drying process to produce larger crystals. For use as inorganic ion exchangers, the wet hydrous zirconium oxide spherules only need to be air-dried to a constant ambient temperature. Hydrous zirconium oxide ion exchangers that have been made as powders are known to be much less effective as sorbents when the interstitial liquid and water of hydration are removed at temperatures $\geq 200°$ C.

Preparation of inorganic ion exchangers as spherules improves the flow dynamics for column operations and expands their practical applications. The hydrous zirconium oxide spherules produced by the present invention can be reproducibly made on a small or large scale. These inorganic ion exchangers are stable in high radiation fields. Many exhibit good chemical stability in acidic and basic solutions while some are highly selective for certain cations and anions. Finally, most are compatible with final waste forms since they may be vitrified or inserted into concrete or any other final waste form process. Inorganic spherules produced by the present invention are useful to remove highly radioactive fission products from hot cell waste solutions. In addition, the inorganic ion exchanger spherules produced by the internal gelation process of the present invention, have sorption characteristics that are equal to or better than those obtained for most commercial powders tested. In many instances, the densities or porosities of the exchangers can be tailored by varying the process parameters.

Some ion exchange applications include removing cesium, strontium, and actinides from acid solutions, as well as removing strontium, technetium, and cesium from tank supernatants. The spherules can also be used for treating contaminated wastewater to remove uranium, technetium, cobalt, and/or lead, among others. Another application of the present invention includes removing radioisotopes from groundwater and removing actinides and fission products from sludge leachates. In addition, other applications include removal of heavy metals from acid mine drainage; removal of radionuclides from any fluid including organic streams; removal of fluoride from waste streams; and cleanup and concentration of liquid wastes in hot cells.

The methods of the present invention can also be used as a means for preparing gels for use in capillary, film or slab gel electrophoresis. For example, a chilled aqueous broth may be vacuumed into capillary tubes or some other article wherein the broths are then heated in the temperature range from about ambient temperatures to about 100° C. to cause gelation. The time of gelation is dependent upon the broth formulation and the temperature. This system defines a gel-forming operation whereby the gels are formed within or on the desired article upon heating in the temperature range from about ambient temperature to about 100° C. Some gels within the gel-forming operation may simply form at room temperature. The same procedure may be used to make hydrous zirconium oxide films or gel slabs. These films or gel slabs are formed using a gel-forming operation in which the broth is gelled at a temperature from about ambient temperature to about 100° C. on a desired film- or slab-forming substrate. The gel-forming operation to form the gel configuration using the internal gelation process is a system in which the formulated broths of the present invention are drawn into molding cavities and heated to temperatures in the range from about ambient temperatures to about 100° C. The surfaces of the molding cavities may be pretreated for easier removal of the gels. Once removed from the molds, the gels may then be washed to remove any reaction impurities.

Figures 1, 1A:
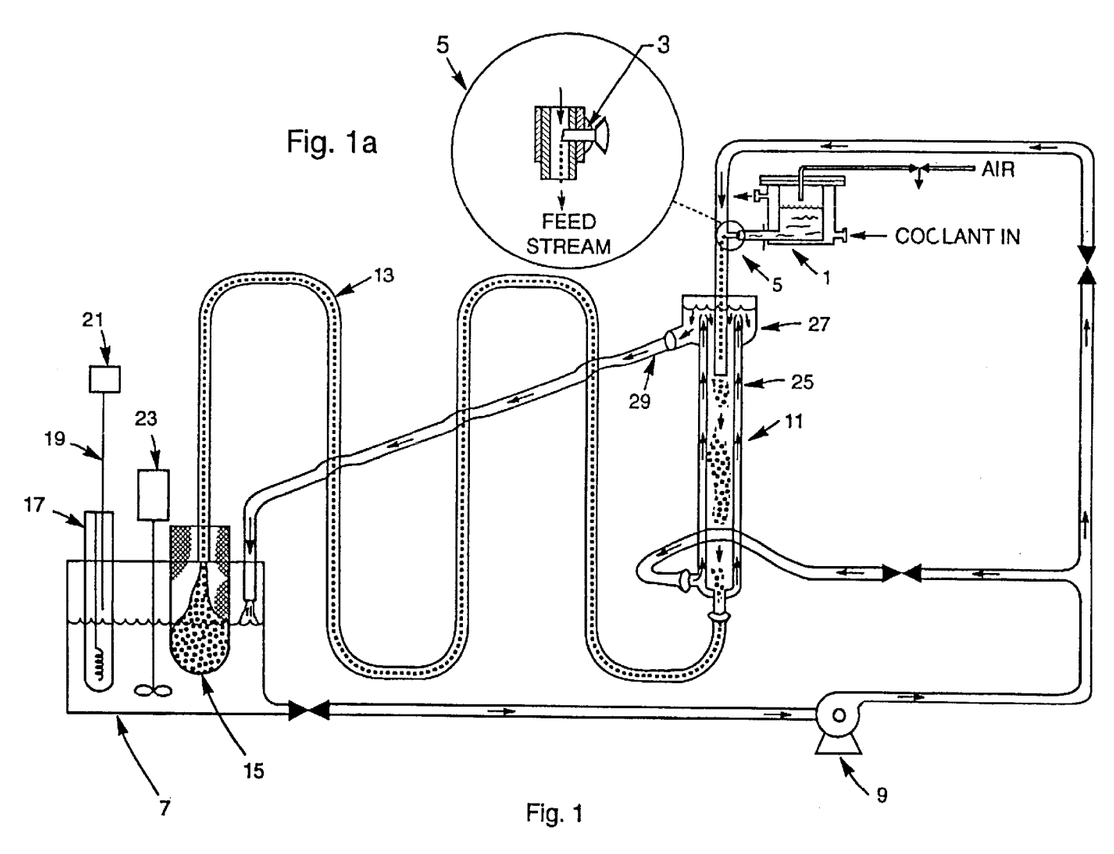
FIGS. 1 and 1a depict an apparatus useful in an internal gelation process for making hydrous zirconium oxide spherules according to one embodiment of the present invention.

FIG. 1 sets forth a lab-scale apparatus for forming hydrous zirconium gel spherules according to the present invention. A chilled broth is first formed and then added to the chilled apparatus broth pot 1 and processed through the gel-forming or spherule-forming apparatus. The system also includes a needle 3 which is used in a two-fluid nozzle 5 for placing broth droplets in the hot organic medium where they gel. The apparatus also includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and is connected to a temperature controller 21 which is used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 which serves as a backup to prevent any spilled gelled spherules from being pumped out of the reservoir to the circulating pump.

The pump 9 is used to pump the hot organic medium from the reservoir 7 through a line to the vertically positioned glass gelation column 11. The flow from the pump 9 is divided into two streams which are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first, into the gelation column 11 and, then, into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 1*a*, the two-fluid nozzle system 5 is very simple. It comprises a needle 3 which is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent upon the gauge of the needle used and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8 ft.) to allow the gelling spherules to have a total residence time of 25 to 35 seconds to the collection basket 15. The transport time also includes the time the spherules are passing through the gelation column. The gelation column and serpentine transport system are designed to be a siphoning system with a gravity head of about 60 cm for oil temperatures in the range of about 55° to 100° C.

The collection basket 15 is positioned above the hot organic medium reservoir 7, and is used to collect and separate the gel spherules from the hot organic medium as they exit the serpentine transport line 13. The collected gel spherules are aged by lowering the collection basket 15 into the reservoir 7 for between 15 and 30 minutes, preferably 20 minutes. After aging, the bulk of the organic medium is drained from the gel spherules and the residual organic medium is removed by a series of washing steps to remove the reaction impurities.

Another basket of similar design may also positioned above the hot oil reservoir to filter the return organic medium from a tube which is connected to the overflow drain line at the top of the gelation column.

In addition to the formation of hydrous zirconium oxide gels in different shapes and forms, the methods of the present invention include post-treatment of the gels in a multitude of different ways to further enhance the use of the of hydrous zirconium oxide gels as inorganic ion exchangers, catalysts, getters and ceramics.

In one embodiment, certain gel-precursor broth formulations of the present invention may be used to provide more control in making ultra fine hydrous zirconium oxide particles or spherules with an electric dispersion reactor (EDR).

In another embodiment, non-dried hydrous zirconium oxide gel spherules can be treated to make macroporous spherules of zirconium hydroxide and zirconium oxide by making use of a method described by S. J. Teichner for making aerogels ("AEROGELS—Why They Are Vogue," ChemTech, pp. 372–377, June, 1991), the disclosure of which is hereby incorporated by reference. After being prepared and washed thoroughly to remove the reaction products, the gel spherules are soaked in absolute ethanol several times to replace the water in the spherules with ethanol. The spherules are drained and then placed in a pressure vessel which also contains a small volume of absolute ethanol. The spherules are then heated and pressurized at slightly above the critical temperature (240.7° C.) and the critical pressure (60.52 atm). The pressure is provided by the vapor pressure of the ethanol in the vessel and by applying additional pressure as needed with a non-reactive gas (such as dry air, nitrogen, or argon). Once these conditions are met, the ethanol in the pressure vessel can be slowly vented from the pressure vessel while the critical pressure is maintained with the non reactive gas. Once the ethanol is purged from the system, the vessel is cooled and the spherules removed. This process prevents the shrinkage of the gel spherules which is caused under normal drying conditions by the movement of the liquid phase in the gel capillaries by evaporation. The surface tension of the liquid creates a concave meniscus in each capillary. As the liquid evaporates, the meniscus recedes, and the compressive forces on the walls of the pores collapse of the internal gel framework resulting in shrinkage. The liquid-vapor interface occurs only below the critical temperature and pressure of the liquid. Above the critical point the liquid no longer exists. The dried macroporous spherules are in the zirconium hydroxide form and can be dried at higher temperature to form macroporous spherules of zirconium oxide. The same process can also be used to make composite macro-porous spherules that contain fine catalytic particles (such as Ni, Pd, Pt, or Ag) that are homogeneously dispersed in the matrix. The fine catalytic particles may be selected from organic catalysts or inorganic catalysts. There is no limit as to the type of catalyst particle chosen. These spherules containing catalytic particles can be used in inorganic syntheses and for converting toxic organics to nontoxic organics in waste treatment.

In another embodiment, organic functional groups may be attached to the hydroxides on the surface of and within the matrix of the macroporous zirconium hydroxide spherules. These functional groups can have cation or anion ion exchange properties which make the engineered, macroporous spherules unique as an inorganic matrix material with organic functional groups. This type of conversion has already been performed by Macherey-Nagel (a German company) using silica-based materials. Macherey-Nagel sells a silica-based strong basic sorbent called NUCLEO-SIL® (imported by Brinkman Instruments) which is very effective in removing technetium and iodine from low ionic strength solutions. These materials are about 5 microns in diameter and can be used in batch treatments. The present invention makes a related material that is zirconium-based in a macroporous engineered form would be very useful in large scale column operations. Since this type of sorbent is primarily inorganic, it would be radiolytic stable if loaded with radioactive nuclides. By "radiolytic stable" it is meant that it will not decompose or degas like some organic sorbents.

In still another embodiment, macroporous zirconium oxide could be used as a getter in removing volatile species of radioactive cesium (such as Cs, CsOH, CsO, or $Cs_2O$) from off-gas streams. Cesium zirconate forms and is stable in the temperature range of 800° to 1300° C. The treatment of off-gas streams of high temperature, waste treatment processes such as vitrification, molten metal, and incineration, is important in the treatment and stabilization of radioactive waste streams. Getters are trapping materials. For example, as discussed above, quartz wool ($SiO_2$) is used to remove volatile radioactive cesium from the off-gas stream of gas cooled nuclear reactors in Great Britain. The cesium silicates that are formed are not stable at temperatures >1000° C. Other oxides such as those of titanium, aluminum, thorium, and uranium could also be used as getters.

In another embodiment, one of the more important materials that can be made as a ceramic precursor with the present invention is barium zirconate or strontium zirconate. Barium zirconate ($BaZrO_3$) and strontium zirconate (SrZrO3) have large permittivities (dielectric constant) and have many potential uses in the electronic industry, particularly in the area of computer and electronic circuitry. One possible method of converting the hydrous zirconium oxide spherules to barium zirconate is to place the undried spherules into a solution of 0.1 M barium hydroxide which also contains barium nitrate. The total barium concentration should be such that the mole ratio of the barium to zirconium in the spherules is $\geq 1$. The spherules are then placed in a sealed stainless steel reaction vessel and heated in the temperature range of 150° to 200° C. for a period of about 0.5 to about 1.0 hours to allow for conversion. After cooling the vessel to ambient temperature, the spherules are washed well with deionized water and dried. If very small spherules are needed, the broth of this invention can be used in several sphere forming systems that are known in the art for generating the smaller sized spherules. For example, broth formulations from the present invention can be used to make small particles, about 0.1 to about 0.5 $\mu$m, using the EDR.

In another embodiment, the hydrous zirconium oxide spherules may be converted to spherules of zirconium monohydrogen phosphate having a desired crystallinity. First, the hydrous zirconium oxide gel spherules are formed. Then, they are rinsed with an amount of phosphoric acid having a concentration $\leq 0.5$ M for a period of time sufficient to allow the spherules to be converted to acid insoluble zirconium monohydrogen phosphate. Next, the spherules are mixed with concentrations of phosphoric acid $\geq 0.5$ M and placed in a sealed pressure vessel. Then, the spherules are covered with an amount of phosphoric acid sufficient to complete the conversion of the spherules to acid insoluble zirconium monohydrogen phosphate and to prevent the hydrous zirconium oxide from dissolving before the conversion. Finally, the spherules are heated in the phosphoric acid to a predetermined temperature up to 100° C. The temperature may increased from ambient temperature up to 100° C. over time to produce the desired crystallinity. After the desired crystallinity has been formed, the spherules may then be cooled and rinsed to remove unreacted phosphoric acid, and then air dried to a constant temperature.

In yet another embodiment, hydrous zirconium oxide spherules having suspendable particles homogeneously embedded within may be prepared to form a composite sorbent. In this process, first a hydrous zirconium oxide broth is formed. Then, a predetermined amount of the suspendable particles are added to the broth, the amount added being of a desired weight percent of the total weight of the composite sorbent. Additionally, the desired weight percent added is an amount sufficient to optimize the effectiveness of the composite sorbent. Then, while continuously mixing the suspendable particles and the aqueous broth to maintain a homogeneous blend, the homogeneous blend is contacted with an immiscible spherule-forming medium at a temperature from about 45° C. to about 100° C. The temperature of the medium is maintained to form sol-gel spherules using an internal gelation process with gelation times sufficient to allow the suspendable particles to remain suspended prior to and up to complete gelation.

In another embodiment, hydrous zirconium oxide spherules may be formed into hydrous zirconium oxide spherules having suspendable particles of at least one different sorbent homogeneously embedded therein to form the composite sorbent previously discussed. Then, these composite sorbent spherules are converted to zirconium monohydrogen phosphate spherules having suspendable particles of the different sorbent homogeneously embedded therein. This embodiment is basically a combination of the previous two embodiments. First, the composite sorbent spherules are formed by mixing the different sorbents into the broth. Then, after the composite sorbent gels are formed, the gels are rinsed with 0.5 M or less phosphoric acid to convert the external surface of the spherules to acid insoluble zirconium monohydrogen phosphate to prevent the hydrous zirconium oxide from dissolving before the conversion. Then, the spherules are mixed with phosphoric acid at a concentration of 0.5 M or higher, and heated to complete the conversion of the spherules to acid insoluble zirconium monohydrogen phosphate.

In another embodiment of the present invention, zirconium oxide particles may be formed. The hydrous zirconium oxide spherules are formed as previously indicated. Then, the spherules are placed in a heating unit to form a bed of spherules within the heating unit, the heating unit providing means to allow moist heated air or oxygen to uniformly flow through the bed of spherules while heating. The moist heated air or oxygen is preferably at a temperature less than the spherules within the heating unit which helps to prevent condensation within the heating unit. The spherules are heated within the heating unit to a temperature and for a period of time sufficient to vaporize the free water within the spheres. The spherules are heated further to a temperature and for a period of time sufficient to form an oxide of zirconium.

In still another embodiment, zirconium oxide particles may be formed having particles of different sorbents homogeneously dispersed therein. This embodiment follows the process outlined in the preceding paragraph relating to the formation of zirconium oxide particles. However, prior to forming the initial hydrous zirconium gel spherules, a predetermined amount of the suspendable particles is added to the broth, the amount added being of a desired weight percent of the total weight of the composite sorbent. Additionally, the amount added is an amount sufficient to optimize the effectiveness of the composite sorbent. Then, after the composite gels are formed, the gels are heated as previously discussed to generate the zirconium oxide particles having particles of different sorbents homogeneously dispersed therein.

In some embodiments, the hydrous zirconium oxide broth may be formed into tubes or fibers. These tubes or fibers may be either of hydrous zirconium oxide or zirconium oxide. Additionally, these tubes or fibers may include suspendable particles homogeneously embedded within the hydrous zirconium oxide or zirconium oxide tubes or fibers. These tubes and fibers are prepared by first forming the broth, either with or without additional particles therein. Then, the broth is formed into a gel, which is then formed into a fiber or a tube. This process may be performed using a number of different tube or fiber forming techniques. For example, the broth may be pulled through an electrophoresis capillary tube. Then, the tube may be heated to a temperature between ambient and 100° C. to form the gel tube. Alternatively, the broth may be formed into gel spherules which are placed in an extruder and extruded into microfibers. The gels could be easily washed to remove any reaction impurities. These tubes and fibers may also be heated to drive off water to form zirconium oxide fibers.

In other embodiments, other shapes of the hydrous zirconium oxide may be formed, such as films or slabs. These films or slabs may be either of hydrous zirconium oxide or zirconium oxide. Additionally, these films may also include suspendable particles homogeneously embedded within the hydrous zirconium oxide or zirconium oxide films or slabs. These films or slabs are prepared by first forming the broth, either with or without additional particles therein. Then, the broth is formed into a gel, which is then formed into the shape of a film or slab. This may be performed using a number of different film- or slab-forming techniques. For example, a substantially flat surface may be inserted into the broth and withdrawn with a thin layer of broth thereon. Then, the surface may be heated to a temperature between ambient and 100° C. to form the gel film. Alternatively, the broth may be formed into gel spherules which are placed in an extruder and extruded into thin films. Finally, the broth may be placed into a mold and heated, thereby forming films or slabs, depending upon the mold. The surfaces of the molding cavities may be pre-treated for easier removal of the gels. Once removed from the molds, the gels could be easily washed to remove any reaction impurities. These films or slabs may also be heated to drive off water to form zirconium oxide films or slabs.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

In Example 1, a broth was prepared as follows. HMTA was used as the organic base and urea was selected for the complexing agent. The broth had an HMTA concentration of 0.6 to 0.7 M, which was the same concentration for the urea. The broth also had a zirconium concentration of 0.48 to 0.64 M and a nitric acid concentration of 0 to 1.2 M. The broth was heated in the range of 85° to 95° C. and resulted in a gelation time of 25 to 30 seconds. To obtain a gelation time of about 10 seconds, the HMTA and urea concentrations were increased to 0.9 M. By increasing the HMTA and urea concentrations to about 1.3 M, it was possible to shorten the gelation time to about 5 seconds. As pointed out previously, a stable broth can be prepared using no acid if the HMTA:Zr ratio is 1:1 or less; however, the gelation time for a broth with a HMTA:Zr ratio of 1 to 1:1 is between 25 and 30 seconds at 90° C. Gels aged for about 10 minutes at the same temperature are medium to rigid, mostly rigid. However, the gels prepared in which no acid was added to the broth were soft. The pH of these gels ranged from about 1.7 to 5 depending upon the HMTA concentration.

Example 2

In Example 2, a broth was prepared as follows. HMTA was used as the organic base and urea was selected for the complexing agent. The broth had an HMTA concentration of 0.8 to 0.9 M, which was the same concentration for the urea. The broth also had a zirconium concentration of 0.48 to 0.64 M and a nitric acid concentration of 0 to 1.2 M. The broth was heated in the range of 75° to 85° C. and resulted in a gelation time of 25 to 30 seconds. To obtain a gelation time of about 10 seconds, the HMTA and urea concentrations were increased to about 1.1±0.2 M. By increasing the HMTA and urea concentrations to about 1.4±0.1 M, gelation time was decreased to about 5 seconds. Only gelation times >30 seconds were obtainable for broths having no acid. Gels aged for about 10 minutes at the same temperature are fairly rigid and the pH of these gels ranged from about 3.5 to 5 depending upon the HMTA concentration. These gels are medium to rigid, mostly rigid. The acid strength has an effect on the rigidity. As the amount of acid employed was decreased, the gel rigidity increased.

Example 3

In this example, a broth was prepared as follows. HMTA was used as the organic base and urea was selected for the complexing agent. The broth had an HMTA concentration of 0.9 to 1.0 M, which was the same concentration for the urea. The broth also had a zirconium concentration of 0.48 to 0.64 M and a nitric acid concentration of 0 to 1.2 M. The broth was heated in the range of 65° to 75° C. and resulted in a gelation time of 25 to 30 seconds. To obtain a gelation time of about 10 seconds, the HMTA and urea concentrations were increased to about 1.4±0.1 M. By increasing the HMTA and urea concentrations to >1.5 M, the gelation time decreased to about 5 seconds. Only gelation times >30 seconds were obtainable for broths having no acid. Gels aged for about 10 minutes at the same temperature are soft to rigid (mostly soft to medium) and the pH of these gels ranged from about 3.5 to 5 depending upon the HMTA concentration. Broths with lower acid strength resulted in more rigid gels.

Example 4

In Example 4, a broth was prepared as follows. HMTA was used as the organic base and urea was selected for the complexing agent. The broth had an HMTA concentration of >1.1 M, which was the same concentration for the urea. The broth also had a zirconium concentration of 0.48 to 0.64 M and a nitric acid concentration of 0 to 1.2 M. The broth was heated in the range of 55° to 65° C. and resulted in a gelation time of 25 to 30 seconds. To obtain a gelation time of about 10–15 seconds, the HMTA and urea concentrations were increased to >1.5 M. Only gelation times >30 seconds were obtainable for broths having no acid. Gels aged for about 10 minutes at the same temperature were soft to medium, and the pH of these gels are $\geq 5$, depending upon the HMTA concentration. Broths with lower acid strength resulted in more rigid gels.

All patents, publications and abstracts cited above are incorporated herein by reference in their entirety.

It should be understood that the foregoing relates only to preferred embodiments of the present invention and that numerous modifications or alterations may be made therein without departing from the spirit and the scope of the present invention as defined in the following claims.

What is claimed is:

1. A method for preparing hydrous zirconium oxide gels comprising the steps of:
   a) forming a homogeneous aqueous broth comprising HMTA, urea, zirconyl nitrate and nitric acid, wherein the broth is at a temperature from about 0° C. to about 10° C., wherein said broth has a HMTA concentration in a range from about 0.6 M to about 1.4 M, a urea concentration in a range from about 0.6 M to about 1.5 M, a zirconyl nitrate concentration in a range from about 0.3 M to about 0.7 M, and a nitric acid concentration in a range from about 0 M to about 1.2 M, further wherein the broth has a mole ratio of HMTA to zirconium of $\geq 1$ and a mole ratio of urea to zirconium of $\geq 1$;
   b) placing the aqueous broth within a gel-forming operation, wherein the gel-forming operation is at a temperature from about ambient to about 100° C.; and
   c) maintaining the temperature of the gel-forming operation from about ambient to about 100° C. to form a hydrous zirconium oxide gel using an internal gelation process.

2. A method for preparing hydrous zirconium oxide gels comprising the steps of:
   a) forming a homogeneous aqueous broth comprising HMTA, urea, a zirconium metal salt and a nitric acid, wherein the broth is at a temperature from about 0° C. to about 10° C., wherein said broth has.an HMTA concentration in a range from about 0.7 M to about 1.35 M, a urea concentration in a range from about 0.7 M to about 1.35 M, a zirconium metal salt concentration in a range from about 0.48 M to about 0.64 M, and a nitric acid concentration in a range from about 0 M to about 1.2 M, further wherein the broth has a mole ratio of HMTA to zirconium of $\geq 1$ and a mole ratio of urea to zirconium of $\geq 1$;
   b) placing the aqueous broth within a gel-forming operation, wherein the gel-forming operation is at a temperature from about 85° C. to about 95° C.; and
   c) maintaining the temperature of the gel-forming operation from 85° C. to about 95° C. to form a hydrous zirconium oxide gel using an internal gelation process.

3. A method for preparing hydrous zirconium oxide gels comprising the steps of:
   a) forming a homogeneous aqueous broth comprising HMTA, urea, a zirconium metal salt and a nitric acid, wherein the broth is at a temperature from about 0° C. to about 10° C., wherein said broth has an HMTA concentration in a range from about 0.7 M to about 1.4 M, a urea concentration in a range from about 0.7 M to about 1.4 M, a zirconium metal salt concentration in a range from about 0.48 M to about 0.64 M, and a nitric acid concentration in a range from about 0 M to about 1.2 M, further wherein the broth has a mole ratio of HMTA to zirconium of $\geq 1.3$ and a mole ratio of urea to zirconium of $\geq 1$;
   b) placing the aqueous broth within a gel-forming operation, wherein the gel-forming operation is at a temperature from about 75° C. to about 85° C.; and
   c) maintaining the temperature of the gel-forming operation from 75° C. to about 85° C. to form a hydrous zirconium oxide gel using an internal gelation process.

4. A method for preparing hydrous zirconium oxide gels comprising the steps of:
   a) forming a homogeneous aqueous broth comprising HMTA, urea, a zirconium metal salt and a nitric acid, wherein the broth is at a temperature from about 0° C. to about 10° C., wherein said broth has an HMTA concentration in a range from about 0.9 M to about 1.4 M, a urea concentration in a range from about 0.9 M to about 1.4 M, a zirconium metal salt concentration in a range from about 0.48 M to about 0.64 M, and a nitric acid concentration in a range from about 0 M to about 1.2 M, further wherein the broth has a mole ratio of HMTA. to zirconium of $\geq 0.9$ and a mole ratio of urea to zirconium of $\geq 0.9$;
   b) placing the aqueous broth within a gel-forming operation, wherein the gel-forming operation is at a temperature from about 65° C. to about 75° C.; and
   c) maintaining the temperature of the gel-forming operation from 65° C. to about 75° C. to form a hydrous zirconium oxide gel using an internal gelation process.

5. A method for preparing hydrous zirconium oxide gels comprising the steps of:
   a) forming a homogeneous aqueous broth comprising HMTA, urea, a zirconium metal salt and a nitric acid, wherein the broth is at a temperature from about 0° C. to about 10° C., wherein said broth has an HMTA concentration of greater than about 1.1 M to about 1.4 M, a urea concentration of greater than about 1.1 M to about 1.4 M, a zirconium metal salt concentration in a range from about 0.48 M to about 0.64 M, and a nitric acid concentration in a range from about 0 M to about 1.2 M, further wherein the broth has a mole ratio of HMTA to zirconium of $\geq 1$ but less than 1.5 and a mole ratio of urea to zirconium of $\geq 1$;
   b) placing the aqueous broth within a gel-forming operation, wherein the gel-forming operation is at a temperature from about 55° C. to about 65° C.; and
   c) maintaining the temperature of the gel-forming operation from 55° C. to about 65° C. to form a hydrous zirconium oxide gel using an internal gelation process.

* * * * *